United States Patent [19]

Heath

[11] Patent Number: 4,913,044

[45] Date of Patent: Apr. 3, 1990

[54] APPARATUS FOR CUTTING A WORK OBJECT

[75] Inventor: George F. Heath, Visalia, Calif.

[73] Assignee: Lindsay Olive Growers, Lindsay, Calif.

[21] Appl. No.: 154,587

[22] Filed: Feb. 10, 1988

[51] Int. Cl.⁴ .............................................. A23N 4/08
[52] U.S. Cl. ........................................ 99/494; 83/53; 83/177; 99/536; 99/549; 99/565
[58] Field of Search .................. 99/516, 494, 534, 536, 99/537, 544, 547, 561, 546, 549, 550, 557, 559, 565; 83/53, 177; 426/481, 484, 485

[56] References Cited

U.S. PATENT DOCUMENTS

| | | | |
|---|---|---|---|
| 1,899,863 | 2/1933 | Gotelli | 99/547 X |
| 2,445,881 | 7/1948 | Hemmeter . | |
| 2,821,223 | 1/1958 | Kagley et al. . | |
| 2,996,092 | 8/1961 | Philbrook . | |
| 3,162,223 | 12/1964 | Loveland . | |
| 3,351,113 | 11/1967 | Susuki et al. . | |
| 3,612,124 | 10/1971 | Cunningham . | |
| 3,877,334 | 4/1975 | Gerber | 83/53 X |
| 3,978,748 | 9/1976 | Leslie et al. . | |
| 4,090,439 | 5/1978 | Chall et al. | 99/494 |
| 4,246,838 | 1/1981 | Pulver et al. . | |
| 4,265,169 | 5/1981 | Silvestrini | 99/494 |
| 4,394,398 | 7/1983 | Wilson . | |
| 4,450,760 | 5/1984 | Wilson . | |
| 4,620,466 | 11/1986 | Jumel et al. . | |
| 4,727,802 | 3/1988 | del ser Gonzalez | 99/494 |

Primary Examiner—Timothy F. Simone
Attorney, Agent, or Firm—Worrel & Worrel

[57] ABSTRACT

An apparatus for cutting a work object utilizing high pressure fluid. The apparatus includes an orientation conveyor which is operable to transport and selectively position the work object in a work station; a water manifold is mounted at the work station and is operable to move along a predetermined path of travel and to deliver a stream of high pressure fluid in the work station to cut the work object; and a control system is borne by the apparatus, and is adapted to coordinate the operation of the water manifold and the orientation conveyor such that the orientation conveyor positions the work object in the work station for a predetermined period of time and the water manifold is energized and directed along the path of travel to cut the work object in a predetermined pattern.

23 Claims, 6 Drawing Sheets

APPARATUS FOR CUTTING A WORK OBJECT

BACKGROUND OF THE INVENTION

1. Field of the Invention

The present invention relates to an apparatus for cutting a work object and more particularly to such an apparatus which performs a cutting operation on a work object employing high pressure fluid, the apparatus having particular utility when utilized to pit fruit, such as olives, the apparatus operable to perform the pitting operation in a highly efficient fashion.

2. Description of the Prior Art

The prior art is replete with numerous examples of prior art fruit processing devices which are adapted to treat or otherwise manipulate fruit or other food products in a particular fashion to achieve a desired end product. In the processing of olives, and more particularly in the removal of the pits from a source of unpitted olives by machine, the prior art devices have generally been operable individually to capture an olive in a predetermined attitude and position while a punch enters from one end of the olive and a cutting die enters from the other end. It should be understood that the punch is forced longitudinally through the olive thereby engaging the olive pit while the cutting die is reciprocated forwardly approximately along the same axis. During this operation, the olive pit is forced out through the end of the olive by the punch and into a bore formed in the cutting die. The punch and the cutting die are retracted and the pit and core are disposed of thereafter.

While the prior art devices and slight variations thereof have operated with varying degrees of success, they have been unsatisfactory in several respects. For example, the prior art devices have sometimes failed when pits have adhered to the punch. This problem, and assembly utilized in an attempt to correct same is set forth in U.S. Letters Patent to Kagley et al. No. 2,821,223, granted on Jan. 28, 1958, entitled, "Pit Dislodgment Jets For Fruit Pitting Machine."

Still another deficiency with the prior art devices results from characteristics inherent in their design inasmuch as the core and the associated pit may, from time to time, become mixed with the pitted fruit or alternatively, the pitting operation may fail and the pit is returned to the olive. In both instances the end product is undesirable in that it may be unsightly in one instance or alternatively presents a potential source of liability for the processor thereof. To address this problem, processors of olives have typically implemented various quality control measures. However, these additional measures are frequently time consuming, and often labor intensive, thus causing the final end product to be somewhat more costly for the end consumer.

Therefore, it has long been known that it would be desirable to have a machine which performs a cutting operation on a work object, the apparatus having particular utility in the pitting of fruit, such as olives, with increased speed, and accuracy, the apparatus operable substantially to reduce the time and labor required to produce a predetermined volume of pitted fruit with the attendant economic savings realized from such reductions.

SUMMARY OF THE INVENTION

Therefore, it is an object of the present invention to provide an improved apparatus for cutting a work object.

Another object is to provide such an apparatus which has particular utility in the pitting of fruit such as olives, the apparatus including a water manifold which is operable to deliver a cutting stream of high pressure fluid to sever the olives in a predetermined pattern.

Another object is to provide such an apparatus which includes an orientation conveyor that is adapted to position the olives in a predetermined attitude and pattern, and move the olives along a path of travel and into cutting relation with the water manifold.

Another object is to provide such an apparatus which includes a coring mechanism which is operable to engage the severed portion of the olive and remove it from the main body of the olive following the severing operation.

Another object is to provide such an apparatus which includes a control means operable whereby the water manifold is selectively directed along a path of travel, and is periodically supplied with a source of high pressure fluid thereby energizing it; and the control means further is adapted to coordinate the movement of the orientation conveyor such that the orientation conveyor is periodically stopped thereby positioning the olives in cutting relation to the water manifold for selected intervals of time, to permit the olives to be severed in a predetermined pattern.

Another object is to provide such an apparatus which operates substantially automatically, and is easily accessed for purposes of maintenance, modification, or the like.

Another object is to provide such an apparatus which is operable to obtain the individual benefits to be derived from related prior art devices while avoiding the detriments individually associated therewith.

Another object is to provide such an apparatus which is characterized by ease of utilization, speed and accuracy of operation, and which can be sold and maintained at a relatively nominal cost.

Further objects and advantages are to provide improved elements and arrangements thereof in an apparatus for the purpose described which is dependable, economical, durable, and fully effective in accomplishing its intended purposes.

These and other objects and advantages are achieved in an apparatus for cutting a work object where, in the preferred embodiment, the apparatus includes an orientation conveyor which is operable to carry a multiplicity of olives along a path of travel and through a work station; a water manifold is borne by the apparatus, and positioned in the work station, the water manifold operable selectively to produce a cutting stream of high pressure fluid which is adapted to sever the olives; and a control means is borne by the machine and adapted to coordinate the movement of the water manifold along a predetermined path of travel, and the movement of the orientation conveyor, whereby the olives are positioned for selected periods of time in the work station and the water manifold is moved along the path of travel to sever the olives in a predetermined pattern.

DESCRIPTION OF THE PREFERRED EMBODIMENT

Figure 1:
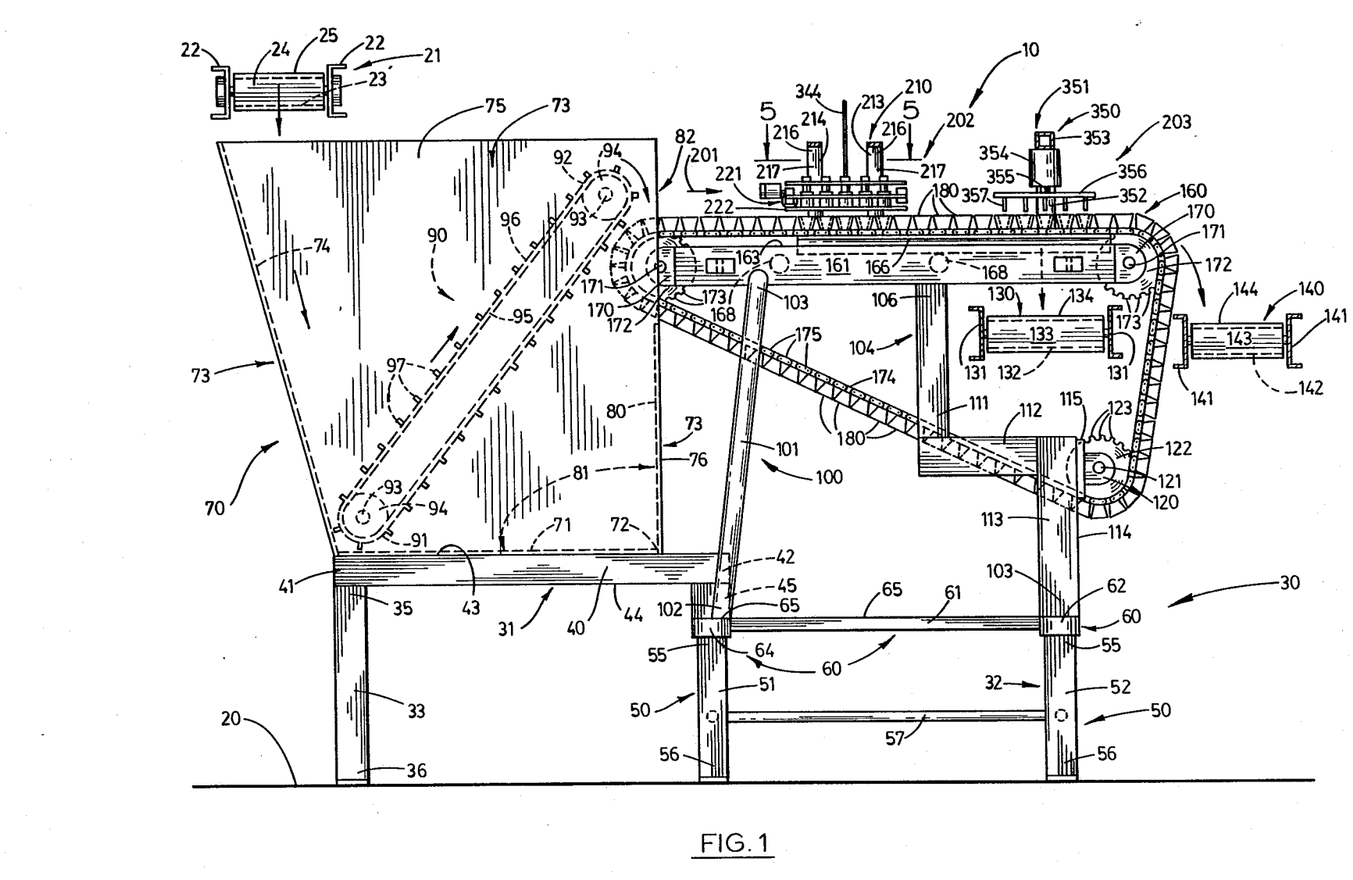
FIG. 1 is a side elevation of the apparatus of the subject invention shown in a typical operative configuration with some underlying structures thereof indicated in hidden lines.

Referring more particularly to the drawings, the apparatus for cutting a work object of the instant invention is generally indicated by the numeral 10 in FIG. 1. The apparatus 10 is adaptable to a wide variety of uses, but has particular utility when employed to pit fruit, such as unpitted olives 11. The olives have a somewhat imperfect substantially ellipsoidal shaped main body 12 which has a longitudinal axis 13, a core portion 14, and a pit 15. As should be understood in the processing of olives, the core portions and the pits are traditionally removed prior to packaging of same. In this regard, a random stream of unpitted olives are transported over the surface of the earth 20 by a first or intake conveyor 21 which is generally indicated by the numeral 21. The intake conveyor is of traditional design having a pair of spaced support members 22 which are operable rotatably to mount a roller 23 which supports a continuous belt 24 having a transporting surface 25. The intake conveyor carries the olives along in the direction of travel indicated by the arrows in FIG. 2 and deposits them, with the help of gravity, into a distribution bin which will hereinafter be discussed in greater detail.

The apparatus 10 is mounted on and disposed in elevated spaced relation to the surface of the earth 20 by a frame which is generally indicated by the numeral 30 in FIG. 1. The frame 30 includes a first portion 31, and a second portion 32. The first portion 31 has first and second earth engaging legs 33 and 34, respectively, each of the legs being positioned in a nearly normal attitude with respect to the surface of the earth 20, and each further having a proximal end 35 and a distal or earth engagement end 36. Mounted to the proximal end of the first and second legs 33 and 34, respectively, by welding or other suitable fasteners, and disposed in a nearly horizontal attitude and in elevated, substantially parallel spaced relation to the surface of the earth, is a pair of horizontally disposed beams 40. Each of the beams 40 has a first end 41 which is affixed to the proximal end 35 of the respective legs 33 and 34; a second end 42; a top surface 43; and an opposed bottom surface 44. Mounted to the first portion 31 of the frame 30, and disposed in supporting relation to the second end 42 of each beam 40 is a third and fourth leg 45 and 46, respectively.

The second portion 32 of the frame 30 has a plurality of upstanding legs which are generally indicated by the numeral 50. The first, second, third, and fourth leg 51, 52, 53 and 54, respectively, each have a first end 55 and a second, or earth engagement end 56. Mounted between each of the legs 51, 52, 53 and 54, and disposed in a substantially horizontal attitude, is a bracing member 57. The bracing member, of course, provides added strength to the second portion 32 of the frame 30. A plurality of horizontally disposed beams 60 are individually mounted to the first end 55 of each of the respective legs 51-54. The beams 60 include a first beam 61 which is mounted between the first leg 51 and second leg 52, respectively; a second beam 62 which is affixed to the first end of the second leg 52 and the third leg 53; a third beam 63 which is affixed between the third leg 53 and the fourth leg 54; and a fourth beam 64 which is mounted to the first end of the forth leg 54 and the first leg 51. The beams 61-64 are each disposed in a substantially horizontal attitude and each have a top or supporting surface 65 which forms a substantially rectangular base upon which various subassemblies of the apparatus 10 are mounted. This is most clearly illustrated by reference to FIG. 2.

An intake or distribution bin, which is generally indicated by the numeral 70, is disposed below and endwardly of the intake conveyor 21 and in receiving relation thereto so as to contain the unpitted olives 11 which fall off of the transporting surface 25 thereof. The intake or distribution bin 70 has a bottom surface 71 which is affixed using welding or the like to the top surface 43 of the pair of beams 40 of the first portion 31. The bottom surface has a circumscribing or peripheral edge 72 which mounts a plurality of side walls generally indicated by the numeral 73. The side walls 73 include an inclined front wall 74 which is operable to channel the unpitted olives 11 received from the intake conveyor 21 into a predetermined location internally of the distribution bin. The inclined front wall is mounted in substantially sealed relation to a pair of substantially vertically disposed side walls 75. The pair of side walls 75 are affixed to a rear wall 76. Each of the side walls 73 has an inside surface 80 which defines a chamber or storage space 81 which receives and holds the unpitted olives for further processing. The rear wall 76 and the pair of side walls 75 define an outlet or opening 82 which is conformably dimensioned to receive one end of the orientation conveyor. The orientation conveyor will hereinafter be discussed in greater detail.

An elevating conveyor which is generally indicated by the numeral 90 is mounted in the chamber 81 of the distribution bin 70 and is operable to remove unpitted olives 11 which are stored therein and deposit them onto the orientation conveyor. The elevating conveyor is of conventional design and includes a first end 91 which is positioned in close proximity to the inside surface 80 of the inclined front wall 74, and the bottom surface 71; and a second or discharge end 92 which is positioned substantially centrally of the opening 82 defined by the rear wall 76, and the pair of side walls 75. A pair of axles 93 are mounted in substantially parallel fixed spaced relation to each other and are disposed therebetween the pair of side walls 75, and are adapted rotatably to mount a pair of rollers 94. The rollers, of course, are operable to mount a continuous belt 95 which has a transporting surface 96 which has discrete pockets 97 formed thereon, the pockets 97 carrying or otherwise transporting the unpitted olives to the second end 92. A source of power, not shown, is mounted in power driving relation to the elevating conveyor and is adapted to impart movement to a continuous belt 95 in the direction of the arrows shown in FIG. 1.

An orientation conveyor frame, which is generally indicated by the numeral 100, is mounted on the top or supporting surface 65 of the horizontally disposed beams 60 of the second portion 32. The conveyor frame 100 has a first pair of supporting arms 101 which are mounted on and are disposed in somewhat angulated relation to the supporting surfaces 65. Each supporting arm further has a first end 102 which is fastened to the second portion 32 of the frame 30 using welding or other suitable fasteners; and a second end 103. The conveyor frame 100 further has a second pair of supporting arms which are generally indicated by the numeral 104. The second pair of arms 104 also have a first end 105 which is affixed to the top surface 65 of the horizontally disposed beams 60, and an opposed second end 106. The second pair of arms has a first, second, and third section hereinafter indicated by the numerals 111, 112 and 113, respectively, which are joined together utilizing welding or the like. As best seen by reference to FIG. 1, the first and second sections and the second and third sections are disposed in substantially normal relation one with the other. The third section 113 has a substantially vertically disposed outwardly facing surface 114 which mounts a horizontally disposed support 115. The support 115 mounts a air of spaced apart bearing housings 120, only one of which is shown, and which are of conventional design. The pair of bearing housings 120 are substantially aligned one with the other and are individually adapted to receive the opposite ends of an axle 121 which mounts a pair of sprockets 122, only one of which is shown in FIG. 1. The sprockets, of course, have a multiplicity of spaced teeth 123 which are individually adapted to engage a chain which will hereinafter be discussed in greater detail.

A waste conveyor which is generally indicated by the numeral 130 is borne by a supporting framework (not shown) and is transversely disposed in waste removing relation beneath the orientation conveyor. The orientation conveyor will hereinafter be discussed in greater detail. The waste conveyor is of conventional design, that is, it has a pair of substantially horizontally disposed support members 131 which mount rollers 132 only one of which is shown. The rollers 132 receive a continuous belt 133 which has a supporting surface 134. The waste conveyor has a path of movement generally indicated by the numeral 135 in FIG. 2. An exhaust conveyor which is generally indicated by the numeral 140, is mounted in substantially parallel, fixed spaced relation to the waste conveyor, and similarly has a pair of spaced apart support members 141 which mount a plurality of rollers 142; only one of which is shown in FIG. 1. The rollers 142 mount a continuous belt 143 which has a supporting surface 144 and a direction of travel which is indicated by the arrows labeled 145 in FIG. 2. The waste conveyor and exhaust conveyor are both connected in driving relation to a source of power, not shown, which is operable to impart movement to the continuous belts mounted thereon.

An orientation conveyor, which is generally indicate by the numeral 160, is disposed in substantial alignment and in receiving relation with the elevating conveyor 90. The orientation conveyor further is supported in spaced, substantially horizontal relation to the surface of the earth 20 by the orientation conveyor frame 100. The orientation conveyor 160 has a first and second support member 161 and 162, respectively, which are affixed, utilizing fasteners or welding, to the first and second pair of supporting arms 101 and 104, respectively. Each of the support members 161 and 162 has a top surface 163, a first end 164, and a second end 165. Individually mounted on, and extending inwardly from, and towards each of the support members 161 and 162, respectively, is a chain guide 166. Each chain guide has a vertically disposed rail 167 which is operable to guide and support a continuous chain that will hereinafter be discussed in greater detail. The first and second support members 161 and 162 are mounted together, and are thereby held in substantially parallel fixed spaced relation one with the other by a plurality of substantially horizontally disposed braces 168. Individually mounted on the opposite ends 164 and 165 of the support members 161 and 162, is a bearing 170. The bearings 170 which are disposed on the first and second ends of the support members are substantially aligned one with the other and are adapted slidably to mount the opposite ends of an axle which is indicated by the numeral 171. Each axle 171 mounts at predetermined positions along its length, a pair of sprockets 172. Each sprocket has a plurality of spaced teeth 173; and the sprockets 172 are substantially aligned with each other, and with the sprockets 122 thereby permitting a pair of continuous chains 174 to be received about each axle and about the sprockets 122 in the fashion illustrated most clearly by reference to FIG. 1. Each continuous chain 174 furthermore has a plurality of links 175 which are interconnected in a fashion familiar to those skilled in the art. Each continuous chain further mounts a plurality of flanges 176 which are disposed on every other link 175 and which individually extend inwardly therefrom and defines a supporting surface 177.

A plurality of substantially rectangularly shaped transportation or orientation bars 180 are serially disposed along, and individually mounted between the pair of continuous chains 174. The orientation bars 180 are further mounted in substantially fixed parallel relation one with another. Each of the transportation bars 180 has a main body 181, which is of substantially frusto-pyramidal cross-section, and a first and second end which is indicated by the numerals 182 and 183, respectively. The main body 181 of each transportation bar 180 is manufactured from a rigid though somewhat resilient synthetic like rubber or plastic-like material, although many similar materials could be substituted in its place. Each transportation bar has a substantially planar top surface 184 and an opposed bottom surface 185. Moreover, each main body has a pair of angulated or inclined side walls 186 and a pair of end walls 187. As best seen by reference to FIGS. 3 and 6, a cavity or flange engagement position 190 is formed into the bottom surface 185 and is disposed in close proximity to the first and second ends 182 and 183, respectively. Each of the cavities 190 is operable individually to receive one of the flanges 176 in secure mating engagement. The main bodies 181 of each transportation bar 180 has a plurality of pockets 191 formed therein. The pockets, which are adapted to position the unpitted olives 11 in a predetermined attitude and pattern on the orientation conveyor 160, each has an upstanding or angulated side wall 192 which defines or otherwise forms a substantially frusto-conically shaped channel 193. The channel 193 is adapted to hold and otherwise encourage the unpitted olives to assume, and be positioned in, a substantially vertical attitude as illustrated most clearly in FIG. 4. Each pocket 191 has an upper, or throat portion 194, which converges into a lower portion 195 that is of decreased diametral dimension. As illustrated most clearly by reference to FIG. 3, each channel 193 has a substantially intermediate diametral dimension which causes the main body 12 of the unpitted olive 11 to be captured therein. However, the diametral dimension of the lower portion permits the core portion 14 of the olive 11 to be slidably received therein. Mounted to the bottom surface 185 and disposed in close proximity to the lower portion 195 of each channel is a circumscribing lip 196.

Figure 2:
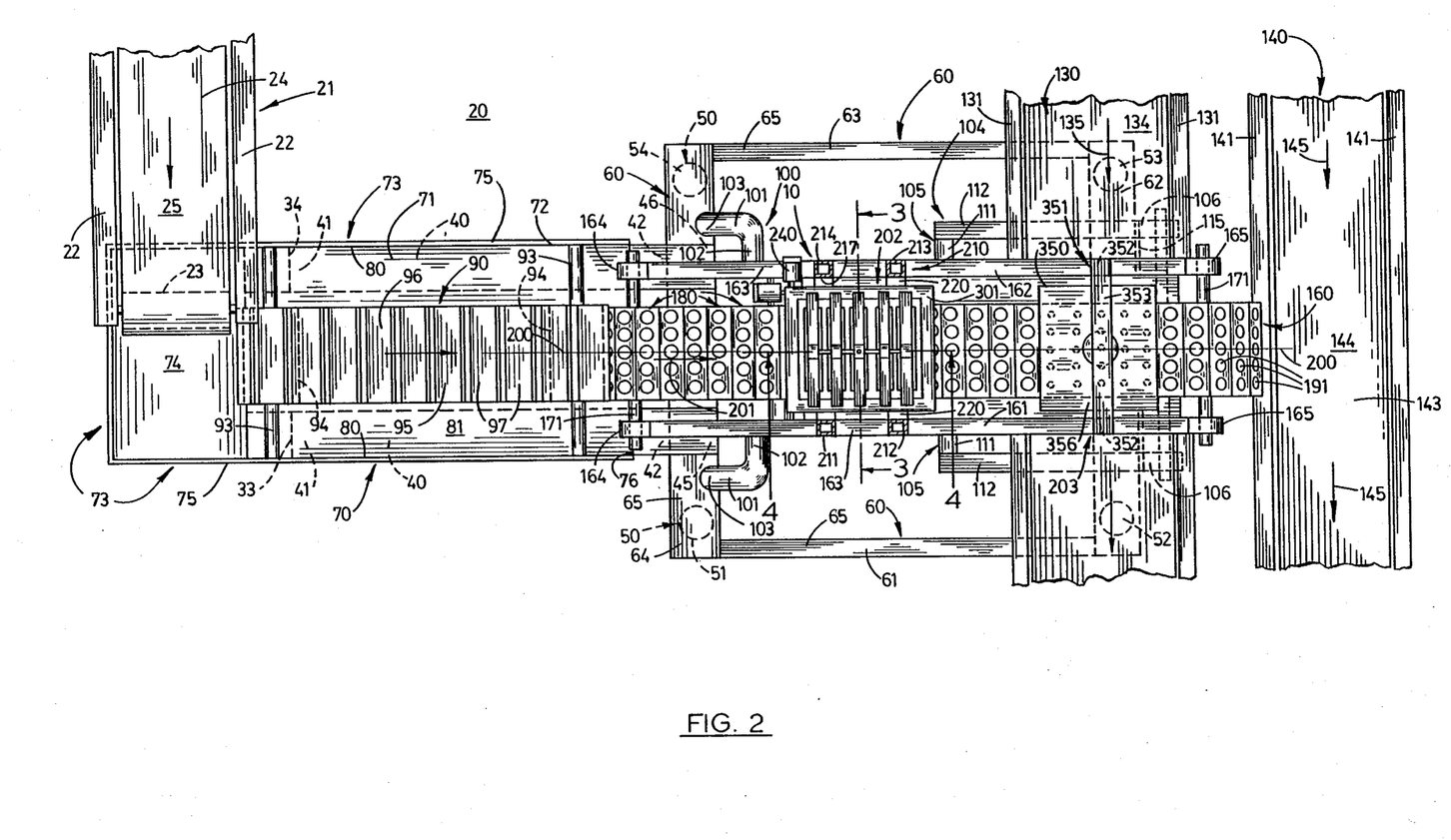
FIG. 2 is a fragmentary, top plan view of the apparatus of the subject invention.

As best understood by reference to FIGS. 1 and 2, the orientation conveyor 160 has a longitudinal axis generally indicated by the line labeled 200 and further has a propulsion means, such as an electric motor (not shown), which is operable to cause the orientation conveyor to transport the olives along a path of travel 201 and through a first and second work station which is indicated generally by the numerals 202 and 203, respectively. As illustrated most clearly in FIG. 1, the electric motor rotates the orientation conveyor in a substantially clockwise fashion, and the first and second work stations are disposed downstream from the distribution bin 70. The elevating conveyor 90 is operable to deposit the unpitted olives 11 from the distribution bin onto the top surface 184 of the orientation bars 180, the unpitted olives finding their way into the individual pockets 191. As earlier discussed, the channels 193 cause the unpitted olives to assume a substantially vertical position when deposited therein. A water manifold support frame, which is generally indicated by the numeral 210, is positioned at, or in close proximity to the first work station 282. The water support frame 210 includes first, second, third, and fourth frame members 211, 212, 213, and 214, respectively. Each of the frame members is substantially vertically disposed and has a first and second end 215 and 216. The first end 215 is affixed to the top surface 163 of the first or second support members 161 or 162 of the orientation conveyor 160.

Figure 3:
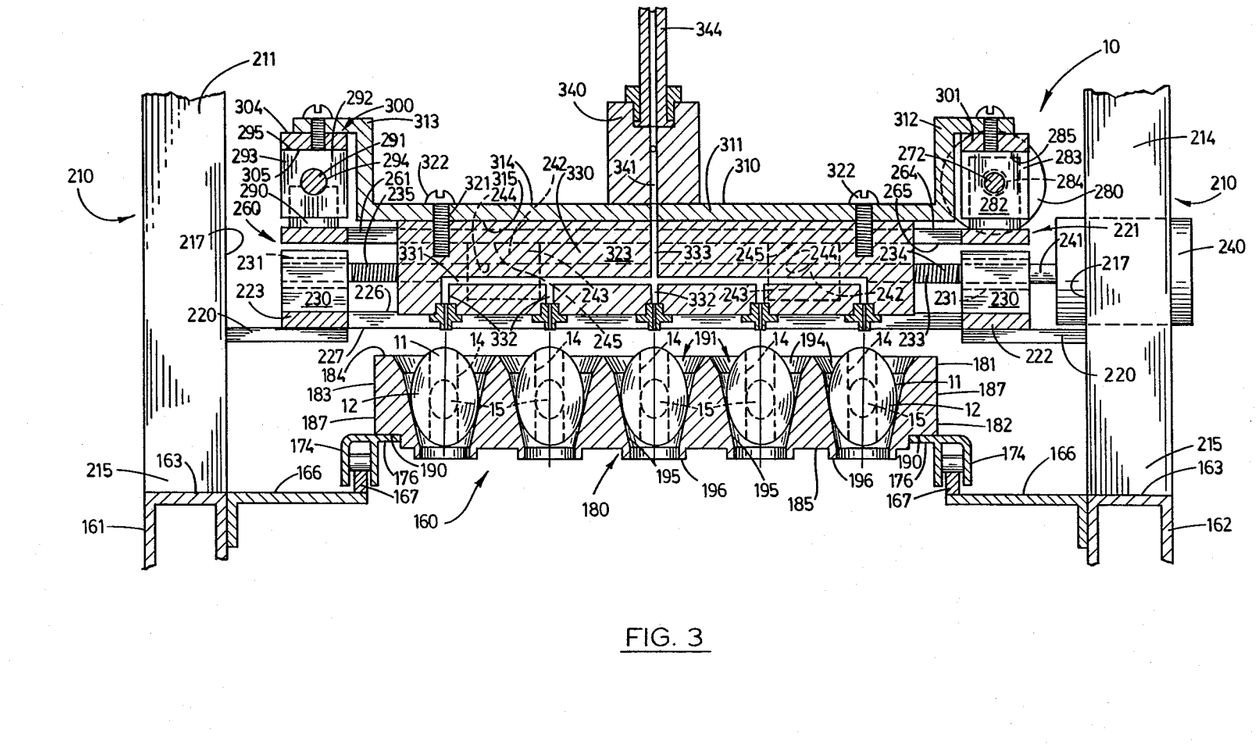
FIG. 3 is a somewhat enlarged, fragmentary, transverse, vertical section of the apparatus taken on line 3—3 of FIG. 2 and showing a plurality of olives positioned on an orientation conveyor and disposed in cutting relation to a water manifold.
Figure 4:
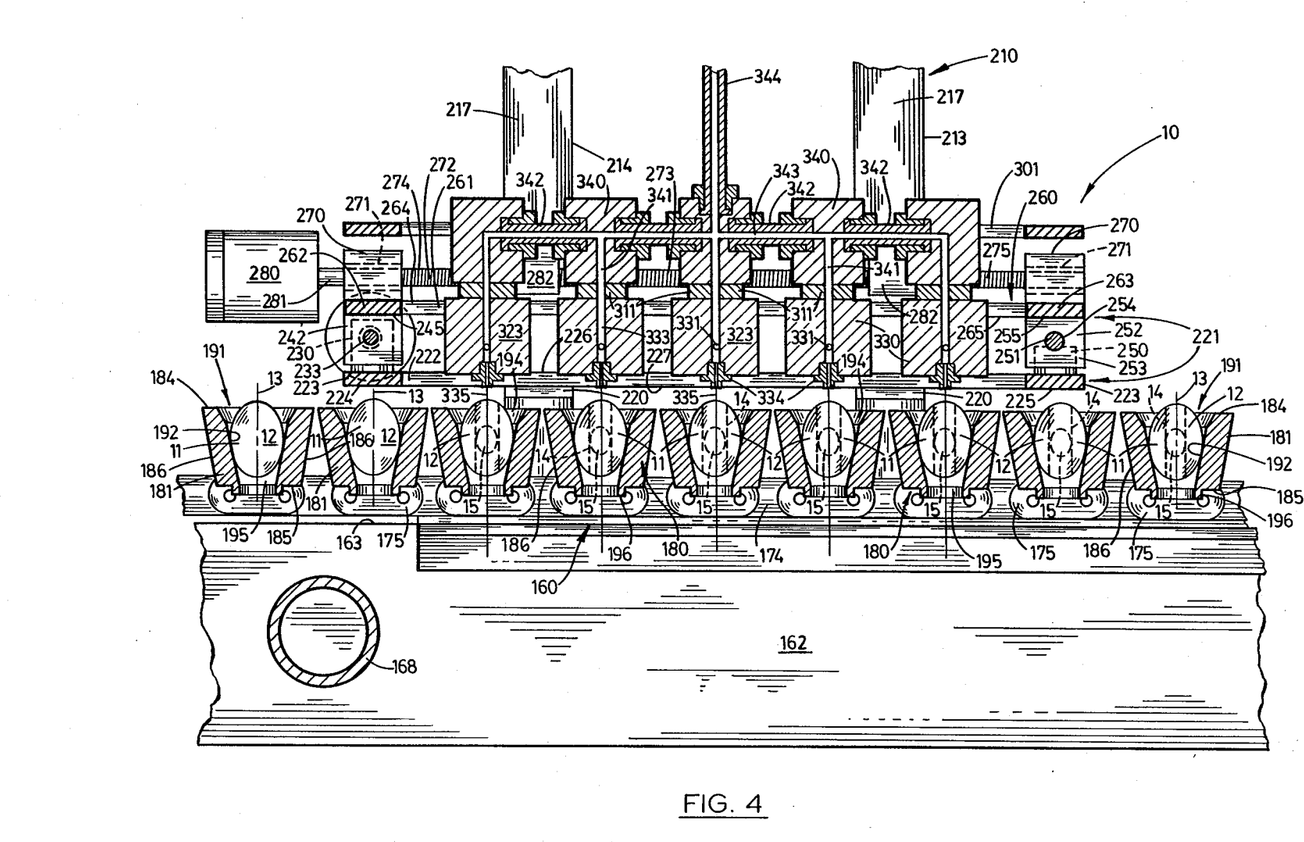
FIG. 4 is a somewhat enlarged, fragmentary, longitudinal, vertical section of the apparatus taken on line 4—4 of FIG. 2.

As illustrated most clearly by reference to FIGS. 2 and 3, each of the frame members 211, 212, 213, and 214, respectively, has an inside surface 217 which mounts, in a predetermined attitude and in substantially parallel spaced relation to the chain guide 166, a mounting bracket 220. Each of the mounting brackets is affixed to the inside surface 217 by welding or other suitable fasteners and are disposed to same at approximately a normal attitude. Each of the mounting brackets is operable to support a water manifold carriage 221 in substantially horizontally spaced overlying relation with respect to the orientation conveyor 160 and in a substantially horizontal attitude with respect to the first work station 202. The carriage 221 has a first portion 222 that has a substantially rectangularly shaped frame 223 which rests on, and is affixed to, the plurality of mounting brackets 220. The rectangularly shaped frame further has a first and second end 224 and 225, and a top and bottom surface 226 and 227.

Mounted on the top surface 226 of the rectangularly shaped frame 223 of the first portion 222 is a first pair of bearing frames or housings 230. The housings 230, which are mounted to the first end 224 of the rectangularly shaped frame and disposed in predetermined spaced relation one with the other are individually adapted to mount bearings 231 which are operable rotatably to receive a ball screw which is generally indicated by the numeral 232. The ball screw 232 has an elongated threaded shaft 233 with a first end 234 and a second end 235 individually supported for rotational movement in the respective housings 230. Affixed in driving relation to the first end 234 of the ball screw 232 and disposed in close proximity to the first end of the rectangularly shaped frame is a first stepper motor 240. The stepper motor is of conventional design, and has an engine shaft 241 which is affixed to the threaded shaft 233. The first stepper motor 240 is connected to a source of electricity and a control means, not shown. The control means includes an encoder which produces pulses of electricity having predetermined durations of time that are transmitted selectively to the first stepper motor, and which are operable, upon receipt, to cause the first stepper motor to rotate the ball screw, from a predetermined starting position, a predetermined number of degrees of rotation. The control means further includes a pair of programmable counters which operate, in a coordinating fashion, with the encoder. The pair of programmable counters are each adapted further to count the pulses of electricity produced by the encoder and at a predetermined number of pulses the pair of programmable counters are operable to reverse the direction of rotational movement of the first stepper motor and begin counting the same predetermined number of pulses again. In this fashion, the encoder and the programmable counters are adapted to cause the first stepper motor to return the ball screw back to the starting position.

A pair of support members 242 are screwthreadably mounted on the threaded shaft 233 of the ball screw 232, and have a main body 243, which has formed therein a threaded channel or passageway 244. Each main body further has a top or supporting surface 245. As can best be seen by reference to FIG. 4, a pair of blocks 250 are mounted to the second end 225 of the rectangularly shaped frame 223. The blocks 250, which are disposed in spaced relation one with the other, are adapted to mount in substantially horizontal spaced relation to the top surface 226 of the rectangularly shaped frame 223, a shaft or rod 251 which is substantially circular in its cross sectional dimensions. The shaft 251, which is disposed in substantially parallel spaced relation to the ball screw 232 slidably mounts a second pair of support members, which are generally indicated by the numeral 252. Each support member has a main body 253 which has a channel or passageway 254 formed therein. The passageway 254 is conformably dimensioned slidably to be received about the shaft 250 and each of the main bodies has a top or supporting surface 255.

A second portion of the water manifold carriage 221 is generally indicated by the numeral 260. The second portion 260 includes a substantially rectangularly shaped frame 261 which is disposed in overlying substantially parallel fixed spaced relation to the rectangularly shaped frame 223 of the first portion 222. The rectangularly shaped frame 261 has a first and second end 262 and 263, and a top and bottom surface 264 and 265, respectively. The bottom surface 265 is affixed to the top or supporting surface 245 and 255 of each pair of support members 242, and 252, respectively. A second pair of bearing frames or housings 270 are mounted to the first end 262 of the rectangularly shaped frame 261 and are adapted individually to mount bearings 271 that are operable rotatably to receive a ball screw 272 which is of similar design and dimension as that of the ball screw 232. The ball screw 272 is disposed in a substantially normal attitude with respect to the ball screw 232 and has a threaded shaft 273, and a first and second end 274, and 275, which are individually received in rotatable mating relation in the respective bearing housings 270. The ball screw 272 is disposed in a substantially horizontal attitude and in fixed substantially parallel spaced relation to the top surface 264 of the rectangularly shaped frame 261 by the bearing housings 270.

Figure 5:
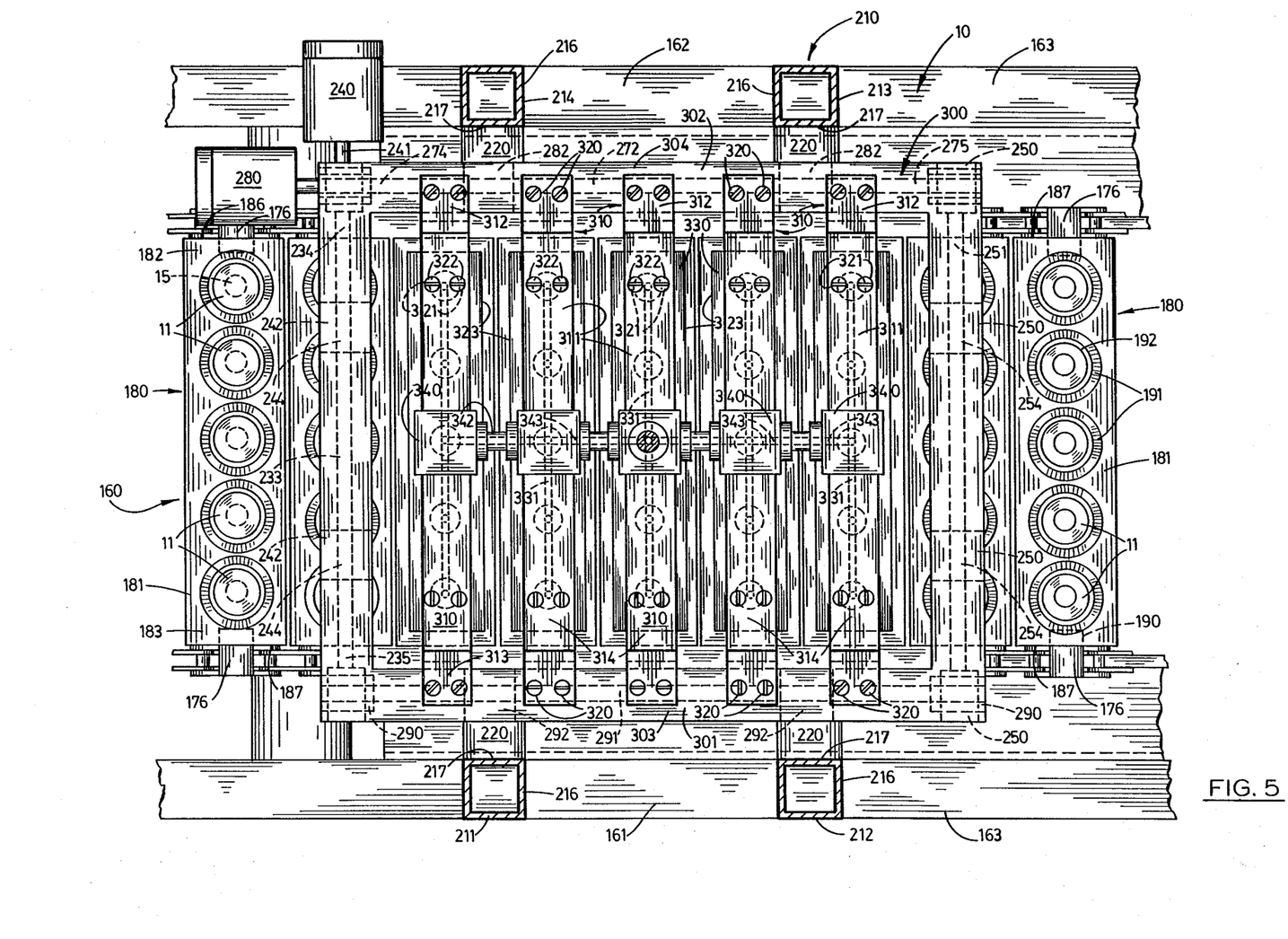
FIG. 5 is a somewhat enlarged, fragmentary, horizontal section of the apparatus taken from a position indicated by the line 5—5 in FIG. 1 and showing the orientation conveyor positioned under the water manifold.

A second stepper motor, which is generally indicated by the numeral 281, is mounted in close proximity to the first end 262 of the rectangularly shaped frame 261 and disposed in driving relation to the threaded shaft 273 of the ball screw 272. The second stepper motor is of similar overall design and operation as that of the first stepper motor 240, that is it has an engine shaft 281 which is affixed to the first end 274 of the threaded shaft 273. The second stepper motor is similarly operably interconnected with a source of electricity, and the control means, not shown, and is responsive to rotate the ball screw 272 from a starting position, a predetermined number of degrees and then return it back to the starting position. As can best be seen by reference to FIGS. 3 and 5, a first pair of support members 282 are screwthreadably mounted on the ball screw 272. Each support member 282 has a main body 283 which has a threaded passageway 284 formed therein. Each of the support members further has a top or supporting surface 285. A second pair of blocks 290 is mounted to the top surface 264 of the rectangularly shaped frame 261 and is disposed at the second end 263 thereof. The second pair of blocks is disposed in spaced relation one to the other, and is adapted to mount a shaft or rod 291, which has a substantially circular cross-sectional dimension. The shaft 291 is mounted in a substantially horizontal attitude, and in fixed substantially parallel relation to the rectangularly shaped frame 261. Further, the shaft 291 is disposed in substantially parallel fixed spaced relation to the ball screw 272, and slidably mounts a second pair of support members 292. The second pair of support members 292 each has a main body 293 that has a passageway 294 formed therein. The passageway 294 is substantially cylindrical in shape and is operable slidably to receive the shaft 291 therein. Each of the support members 292 further has a top or supporting surface 295.

A third portion of the water manifold carriage 221 is generally indicated by numeral 300. The third portion of the manifold carriage has a substantially rectangularly shaped frame 301 which is disposed in substantially overlying parallel spaced relation to the second portion 260 and is mounted in fixed substantially parallel spaced relation to the first portion 222. The rectangularly shaped frame has a left and right side 302 and 303, and a top and bottom surface 304 and 305, respectively. As best illustrated by reference to FIGS. 3 and 5, a plurality of manifold hangers 310 are individually mounted to the left and right side of the rectangularly shaped frame 301 and are disposed in substantially parallel fixed spaced relation one with the other. Each hanger 310 has a main body 311 which has opposed first and second ends 312 and 313; and top and bottom surfaces 314 and 315, respectively. Each hanger further is mounted or otherwise affixed to the rectangularly shaped frame 301 by a pair of machine screws 320 which are screwthreadably received through the first and second ends 312 and 313, respectively. The machine screws 320 engage the rectangularly shaped frame 301 disposed thereunder. Two pairs of orifices 321 are formed in the main body 311 of each hanger 310, and are individually adapted screwthreadably to receive a machine screw 322. The plurality of machine screws 322 are adapted screwthreadably to mount a water manifold 323 to each hanger.

A plurality of water manifolds, which are generally indicated by the numeral 323, are serially interconnected in fluid flow relation one with the other, and are individually operable to deliver a stream of high pressure water or other fluid in the first work station 202 to cut the unpitted olives 11 which are disposed thereunder. Each water manifold has a substantially rectangularly shaped main body 330 which is formed from a material which can withstand the high water pressure which will be utilized. Typically, the main body will be formed out of stainless steel or some other suitable non-corrosive material. Formed substantially centrally and longitudinally of the rectangularly shaped main body of each water manifold is a fluid passageway 331 which terminates into several outlet passageways 332. Mounted to the main body 330 and disposed in individual fluid directing relation to the plurality of outlet passageways are a plurality of constricted diameter jets 334. Each of the jets is operable to form a stream of high pressure fluid 335 which is directed against an unpitted olive 11 that is disposed thereunder. As best seen by reference to FIGS. 3 and 6, the jets of the water manifold are disposed in substantial alignment with the pockets 191 that are formed in the orientation bars 180 of the orientation conveyor 160.

The plurality of water manifolds 323 are serially connected in fluid transferring relation one with the other, and with a source of high pressure water (not shown) by an intake manifold 340 which is mounted to the top surface 314 of each manifold hanger 310. Each intake manifold has a fluid passageway 341 formed therein which communicates in fluid flow relation with the fluid passageway 331. As best seen by reference to FIGS. 4 and 5, a plurality of high pressure conduits 342 interconnect the intake manifolds thereby serially connecting them in fluid flow relation. The high pressure conduits define a fluid passageway 343 which communicates directly with a high pressure intake line 344 which in turn is connected in fluid communication with the source of high pressure fluid, not shown.

Figure 6:
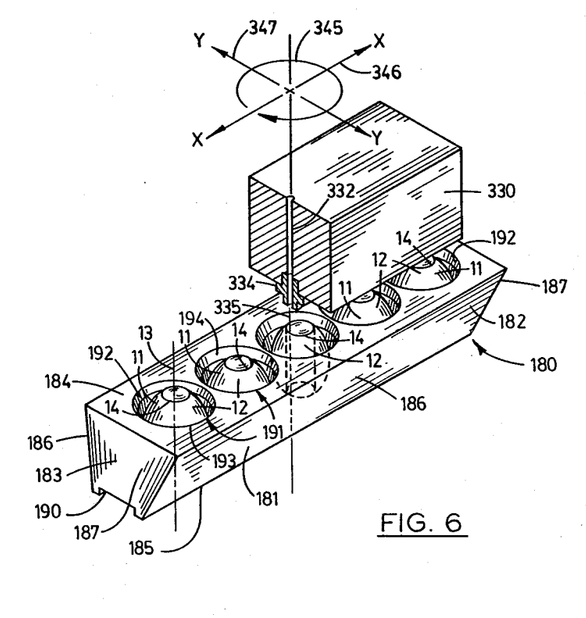
FIG. 6 is a somewhat enlarged, fragmentary, diagrammatic perspective view of the apparatus with assorted supporting surfaces removed and showing a water manifold operable to move along an X axis and a Y axis directions of travel thereby delivering a cutting stream of high pressure fluid to sever the olives disposed thereunder in a predetermined pattern.

As can best be seen in FIG. 6, the control means is operable selectively to stimulate the first and second stepper motors 240 and 280, respectively, to propel the water manifolds along a predetermined path of travel 345. The path of travel has two components, an X axis path of travel 346, and a Y axis path of travel 347. The X axis path of travel is caused by the pulsing of the first stepper motor 240 and the Y axis path of travel is caused by the pulsing of the second stepper motor 280. It should be understood that the control means selectively provides the source of high pressure fluid to the water manifolds, and further selectively transmits to the first and second stepper motors 240 and 280 respectively the pulses produced by the encoder in such a predetermined sequence that the jets of the individual water manifolds move in a substantially circular pattern along the path of travel thereby causing the stream of high pressure fluid 335 to sever or cut out the core portion 14 of the olives. The core portion, of course, includes the pit 15. The control means further positions the olives in fixed relation in the first work station 202 by controlling the movement of the orientation conveyor 160. As should be understood, the control means actuates the orientation conveyor thereby causing it to move a predetermined distance and then stop for a selected period of time. The distance the orientation conveyor travels is predetermined to permit each orientation bar 180 to be individually disposed in cutting relation to an individual water manifold 323 while the water manifold performs the cutting operation and later transports the olives to the second work station for further processing.

A coring mechanism, which is generally indicated by the numeral 350, is mounted downstream of the first work station 202 and is disposed at or in close proximity to the second work station 203, and in substantially overlying spaced relation to the orientation conveyor 160. The coring mechanism, which is mounted in core removing relation with respect to the plurality of pockets 191 is mounted at the second work station by a frame 351. The frame 351 includes a pair of substantially vertically disposed beams 352 which are individually mounted in upstanding relation on the first and second support members 161 and 162 of the orientation conveyor 160. A horizontally disposed beam 353 connects the pair of vertically disposed beams 352. Mounted substantially centrally of the horizontally disposed beam 353 is an air or hydraulically actuated cylinder 354. The cylinder is of conventional design and has a ram 355 which mounts at its distal end a substantially rectangularly shaped plate 356. The plate, which is disposed in a substantially horizontal attitude mounts a plurality of rods or fingers 357 which are substantially aligned with the plurality of pockets 191 disposed thereunder. As should be understood, each of the rods 357 have a cross-sectional dimension which permits them to be individually received in the channels 193 that are defined by the pockets. The rods are operable when urged into contact with olives disposed thereunder to push out the core portion 14, the core portion including the pit 15, being urged out through the lower portion 195 of the channel 193 and falling under the influence of gravity onto the waste conveyor 130, which is disposed transversely of, and under the orientation conveyor 160, the waste conveyor mounted in substantial alignment with the second work station.

The waste conveyor 130, of course, transports the core portion 14 to a remote location for disposal. The olives 11 are then transported by the orientation conveyor to the second end thereof and fall under the influence of gravity out of the pockets 191 and are collected on the exhaust conveyor 140. The exhaust conveyor transports these cored olives to a remote location for further processing.

OPERATION

The operation of the described embodiment of the present invention is believed to be readily apparent and is briefly summarized at this point.

The apparatus 10 is best understood by a study of FIG. 1. As shown therein, an intake conveyor 21 is operable to supply a stream of unpitted olives 11 to an intake bin 70 which mounts an elevating conveyor 90. The elevating conveyor 90 is disposed in supplying relation to the orientation conveyor 160 and is adapted to drop the unpitted olives onto the top surface 184 of the orientation bars 180, the olives finding their way individually into the plurality of pockets 191 formed therein. Having been received in the pockets, the orientation conveyor 160 is operable to carry the olives along the path of travel 201 and into cutting relation with the water manifolds 323 which are mounted at the first work station 202. The control means is operable to control the movement of the orientation conveyor such that it periodically moves a predetermined distance and then stops for a set duration of time, the control means causing the orientation conveyor to position the pockets, carrying the olives, in cutting relation with respect to the plurality of jets 334 which are mounted on the individual water manifolds.

Following the transportation of the unpitted olives 11 into cutting relation with the individual water manifolds 323, the orientation conveyor 160 is stopped, and the water manifolds are energized by supplying them with high pressure water through the intake line 344. As the step of energizing is taking place, the control means is operable substantially simultaneously to cause the first and second stepper motors 240 and 280, respectively, to urge the water manifolds 323 along the path of travel 345 thereby causing the cutting streams 335 to cut out the core portions 14 of the olives 11. Following the cutting operation, the control means deenergizes the water manifold and the orientation conveyor transports the olives to the second work station 203 where it is again stopped. At the second station the coring mechanism is operable to push the core portions out of the olives, the olive cores and pits 15 dropping onto the waste conveyor 130. After this step is completed, the olives are dropped onto the exhaust conveyor 140 for transportation to a remote area for further processing.

Therefore, it will be seen that the apparatus 10 has particular utility when employed to pit fruit, such as olives, the apparatus providing a fully dependable and practical means for cutting and removing the core portions thereof rapidly and conveniently, while reducing to an absolute minimum the possibility of malfunction, and which is both of sturdy and dependable construction and is relatively inexpensive to maintain.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. An apparatus for cutting olives to be pitted, the apparatus comprising:

an orientation conveyor mounted on the apparatus for conveying olives through at least one work station and operable selectively to position said olives in the work station during the cutting operation and having a plurality of upstanding pockets which are operable to position the olives in predetermined attitudes in a pattern in said work station;

a water manifold borne by the apparatus and positioned at the work station, the water manifold operable to move along a predetermined path of travel and deliver a stream of high pressure fluid in the work station to cut the work object; and control means mounted on the apparatus for coordinating the operation of the water manifold and the orientation conveyor and adapted periodically to stop the orientation conveyor whereby the olives are positioned in substantially fixed relation in the work station during selected intervals of time and the water manifold is directed along a path of travel and substantially simultaneously delivers the high pressure fluid to cut the olives.

2. The apparatus of claim 1 wherein the water manifold is disposed in elevated spaced relation to the orientation conveyor, and a carriage is mounted to the manifold and borne by the apparatus to support the water manifold, the carriage having a first portion which is mounted on the water manifold and operable to move along an X axis, and a second portion which is borne by the apparatus and mounted on the first portion, the second portion operable to move the water manifold along a Y axis, and a stepper motor is mounted on the first and second portions and operable to propel the first and second portions along the respective axes, each stepper motor selectively responsive to the control means and operable to direct the water manifold along the path of travel.

3. The apparatus of claim 2 wherein a plurality of water manifolds are mounted on the carriage and each water manifold mounts a multiplicity of jets which are disposed in substantial cutting alignment with the pockets mounted on the orientation conveyor, and a ball screw is rotatably mounted on each portion of the carriage and engaged by the stepper motor mounted thereon, the individual ball screws urging the first and second portion along their respective X and Y axis.

4. The apparatus of claim 3 wherein the X and the Y axes are substantially horizontally disposed and in substantially normal attitudes one with the other.

5. The apparatus of claim 4 wherein the first portion of the carriage has a frame which is mounted on the apparatus, and has a first pair of bearings which are adapted rotatably to support the ball screw in a substantial horizontal attitude, the ball screw screwthreadably mounting a support member which is affixed to the second portion; and a bar is disposed in substantially horizontal parallel fixed spaced relation to the ball screw and mounted on the frame, the bar slidably mounting a second support member which is affixed to the second portion.

6. The apparatus of claim 5 wherein the second portion of the carriage is disposed in substantially parallel spaced overlaying relation with respect to the first portion and has a frame which mounts a second pair of bearings which are adapted rotatably to support in a substantially horizontal attitude the ball screw mounted thereon, the ball screw screwthreadably mounting a first support member which is affixed to the water manifold; and a second bar is disposed in substantially horizontal, parallel fixed spaced relation to the ball screw and mounted on the frame of the second portion, the second bar slidably mounting a second support member which is affixed to the water manifold.

7. The apparatus of claim 6 wherein the control means has an encoder which produces pulses which are selectively transmitted to the stepper motors, each pulse received by the individual stepper motors operable to cause the individual stepper motors to rotate each ball screw, from a starting position, a predetermined number of degrees of rotation; and two programmable counters are operable to count the pulses produced by the encoder and at a predetermined number of pulses the counters are adapted to reverse the direction of rotation of the stepper motors and begin counting the same predetermined number of pulses again, the stepper motors returning the respective ball screws to the starting position.

8. The apparatus of claim 7 wherein the encoder transmits pulses to each stepper motor in a predetermined sequence, and the stepper motors move the water manifolds responsively to these pulses in a substantially circular pattern along the path of travel, the stream of high pressure fluid emitted from the water manifolds severing a portion of the olive positioned in cutting relation thereto.

9. The apparatus of claim 8 wherein each of the pockets has an upper throat portion and a lower base portion which define a channel, the channel having a diametral dimension which diminishes from the throat portion to the base portion, the channel oriented in a substantially vertical attitude and extending through the orientation conveyor; and the severed portion of the olive has a diametral dimension which is less than the diametral dimension of the channel in the immediate vicinity of the base portion thereof.

10. The apparatus of claim 9 wherein the orientation conveyor carries the olives through a second work station which is positioned downstream from the first work station, and a mechanism is mounted at the second work station and operable to push out the severed portions of the olives previously cut out by the water manifold, the severed portions of the olives being urged out through the channel.

11. The apparatus of claim 10 wherein the mechanism mounted at the second work station has a frame which mounts a movable plate having a plurality of rods that are individually disposed in substantial alignment with the severed portion of each olive, and the plate is adapted to carry the rods into individual engagement with the severed portions of the olives, the rods pushing the severed portions out through the channels.

12. The apparatus of claim 11 wherein an intake conveyor is operable to deposit the unpitted olives into the pockets, and a waste conveyor is positioned downstream of the intake conveyor and underneath the orientation conveyor, the waste conveyor disposed in substantial alignment with the second work station and adapted to receive the severed portions of the olives which are pushed out by the mechanism mounted at the second work station, the waste conveyor transporting the severed portions to a remote location for disposal.

13. The apparatus of claim 12 wherein an exhaust conveyor is disposed downstream of the second work station and in receiving relation to the orientation conveyor to transport the olives to a remote location for further processing.

14. An apparatus for cutting work objects wherein the work objects are olives, the apparatus comprising: 'an orientation conveyor operable to transport a multiplicity of olives along a path of travel through at least one work station, the orientation conveyor having a plurality of pockets each of which has an upstanding side wall which is operable to orient each olive in a predetermined attitude, and defining a channel which extends through the orientation conveyor;

a water manifold mounted at the work station and borne by the apparatus, the water manifold disposed in fluid cutting relation with respect to the orientation conveyor and having a plurality of water jets individually disposed in substantial alignment with each pocket, each of the water jets adapted to emit a stream of high pressure fluid which cuts through the olives, the water manifold being urged along a predetermined path of travel thereby causing the olives to be cut in a predetermined pattern;

a source of high pressure fluid connected in fluid supplying relation with the water manifold and operable to supply high pressure fluid to the water manifold during selected periods of time;

a carriage mounted on the apparatus and to the water manifold and positioned in the vicinity of the work station, the carriage operable to carry the water manifold along the path of travel and having a first portion, mounted on the apparatus and connected to the water manifold and adapted to carry the water manifold in an X axis direction of travel, and a second portion connected to the water manifold and to said first portion, the second portion operable to carry the water manifold in a Y axis direction of travel; and control means borne by the apparatus for selectively directing the water manifold along the path of travel, periodically supplying the high pressure fluid to the water manifold, and controlling the movement of the orientation conveyor whereby the olives are positioned by the orientation conveyor in cutting relation with respect to the water manifold, and the water manifold is energized by supplying the high pressure fluid thereto, the control means thereafter causing the carriage to carry the water manifold along the path of travel to cut the olives in a predetermined pattern.

15. The apparatus of claim 14 wherein the first portion of the carriage has a frame disposed in overlaying relation to the orientation conveyor and mounting a stepper motor, and a first ball screw is rotatably supported in substantially horizontal relation on the frame and mounted on the stepper motor, the ball screw screwthreadably mounting a first support member which is affixed to the water manifold; and a bar is mounted on the frame and disposed in substantially parallel fixed spaced relation to the ball screw, the bar slidably mounting a second support member which is affixed to the water manifold.

16. The apparatus of claim 15 wherein the second portion of the carriage has a frame disposed in overlaying relation to the orientation conveyor and to the first portion and mounting a second stepper motor, and a second ball screw is rotatably supported in substantially horizontal relation on the second portion of the frame and mounted on the second stepper motor, the second ball screw screwthreadably mounting a first support member which is affixed to the water manifold; and a bar is mounted on the frame of the second portion and disposed in substantially parallel fixed spaced relation to the second ball screw, the bar slidably mounting a second support member which is affixed to the water manifold.

17. The apparatus of claim 16 wherein the orientation conveyor has a longitudinal axis; and the X axis direction of the travel is substantially transverse to the longitudinal axis of the orientation conveyor, and the Y axis direction of travel is substantially parallel to the longitudinal axis of the orientation conveyor.

18. The apparatus of claim 19 wherein each of the pockets has an upper throat portion and a lower base portion which define a channel with a diametral dimension which diminishes from the throat portion to the base portion, each channel oriented in a substantially vertical attitude and extending through the orientation conveyor, and the severed portion of the olive has a diametral dimension which is less than the diametral dimension of the channel in the immediate vicinity of the base portion thereof.

19. The apparatus of claim 18 wherein the control means is operable selectively to energize each stepper motor, each stepper motor upon energizing rotating its respective ball screw a predetermined number of degrees, the individual ball screws selectively moving the first and second portion of the carriage whereby the jets of the water manifold are moved in a substantially circular patterns to cut out core portions of the olives.

20. The apparatus of claim 19 wherein the orientation conveyor carries the olives through a second work station which is disposed downstream from the first work station; and a mechanism is mounted at the second work station and operable to remove the core portion of each olive previously cut from the olive through said channel.

21. The apparatus of claim 20 wherein the mechanism mounted at the second work station has a frame which mounts a movable plate having a plurality of rods, each rod disposed in substantial alignment with the core portion of each olive, and the plate is adapted to carry the rods into individual engagement with the core portions of the olives thereby pushing the individual core portions out through the channels.

22. The apparatus of claim 21 wherein an intake conveyor is operable to deposit the olives into the pockets, and a waste conveyor is positioned downstream of the intake conveyor and underneath the orientation conveyor, the waste conveyor disposed in substantial alignment with the second work station and adapted to receive the core portions of the olives which are pushed out by the mechanism at the second work station, the waste conveyor transporting the severed portions to a remote location for disposal.

23. The apparatus of claim 22 wherein an exhaust conveyor is disposed downstream of the second work station and in receiving relation to the orientation conveyor, the exhaust conveyor transporting the olives to a remote location for further processing.

* * * * *

UNITED STATES PATENT AND TRADEMARK OFFICE
CERTIFICATE OF CORRECTION

PATENT NO. : 4,913,044

DATED : April 3, 1990

INVENTOR(S) : George F. Heath

It is certified that error appears in the above-identified patent and that said Letters Patent is hereby corrected as shown below:

Column 16, line 7, delete "19" and insert --17--

Column 16, line 23, delete the word "a"

Signed and Sealed this

First Day of January, 1991

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,913,044
DATED : April 3, 1990
INVENTOR(S) : George F. Heath

It is certified that error appears in the above-identified patent and that said Letters Patent is hereby corrected as shown below:

Page 3, Column 5, Line 65

Delete "indicate" and Insert ---indicated---

Page 4, Column 7, Line 37

Delete "282" and Insert ---202---

Page 7, Column 14, Line 53

Delete "'an" and Insert ---an---

Signed and Sealed this

Twenty-eighth Day of May, 1991

Attest:

HARRY F. MANBECK, JR

Attesting Officer      Commissioner of Patents and Trademarks